United States Patent
Koppes et al.

(10) Patent No.: US 9,248,470 B2
(45) Date of Patent: Feb. 2, 2016

(54) COLORIZED RETROREFLECTIVE MATERIAL AND METHOD

(75) Inventors: Robert D. Koppes, St. Paul, MN (US); Aaron K. Brannan, Minneapolis, MN (US)

(73) Assignee: Safe Reflections, Inc., St. Paul, MN (US)

( * ) Notice: Subject to any disclaimer, the term of this patent is extended or adjusted under 35 U.S.C. 154(b) by 1723 days.

(21) Appl. No.: 11/780,595

(22) Filed: Jul. 20, 2007

(65) Prior Publication Data

US 2008/0026193 A1   Jan. 31, 2008

Related U.S. Application Data

(60) Provisional application No. 60/820,866, filed on Jul. 31, 2006.

(51) Int. Cl.
| | |
|---|---|
| *B32B 5/00* | (2006.01) |
| *B05D 5/06* | (2006.01) |
| *B32B 27/12* | (2006.01) |
| *D06Q 1/12* | (2006.01) |
| *G02B 5/128* | (2006.01) |

(52) U.S. Cl.
CPC .............. *B05D 5/063* (2013.01); *B32B 27/12* (2013.01); *D06Q 1/12* (2013.01); *G02B 5/128* (2013.01); *Y10T 428/24901* (2015.01)

(58) Field of Classification Search
USPC ....................................................... 428/207
See application file for complete search history.

(56) References Cited

U.S. PATENT DOCUMENTS

| | | | |
|---|---|---|---|
| 4,153,412 A | 5/1979 | Bailey | |
| 4,763,985 A * | 8/1988 | Bingham | G02B 5/28 359/518 |
| 5,344,705 A | 9/1994 | Olsen | |
| 5,503,906 A | 4/1996 | Olsen | |
| 5,514,441 A * | 5/1996 | Pohto et al. | 428/72 |
| 5,620,613 A | 4/1997 | Olsen | |
| 5,620,775 A * | 4/1997 | LaPerre | 428/149 |
| 5,650,213 A * | 7/1997 | Rizika et al. | 428/143 |
| 5,939,182 A * | 8/1999 | Huang et al. | 428/323 |
| 5,976,669 A | 11/1999 | Fleming | |
| 6,156,436 A * | 12/2000 | Joseph | G02B 5/128 359/540 |
| 6,365,262 B1 * | 4/2002 | Hedblom | E01F 9/044 359/536 |
| 6,859,941 B2 | 3/2005 | Koppes | |
| 2002/0037364 A1 * | 3/2002 | Fleming | 427/162 |
| 2004/0018344 A1 * | 1/2004 | Watkins | G02B 1/105 428/156 |
| 2004/0191481 A1 * | 9/2004 | Erb | G02B 5/128 428/143 |
| 2005/0137289 A1 * | 6/2005 | Hooftman et al. | 523/218 |

FOREIGN PATENT DOCUMENTS

EP    615788 A1 *  9/1994

* cited by examiner

*Primary Examiner* — Tahseen N Khan
(74) *Attorney, Agent, or Firm* — Dickstein Shapiro LLP

(57) ABSTRACT

A colorized retroreflective materials for use on clothing are colorized by including a substantially transparent colorizing overlayer composition applied to a retroreflective layer, the overlayer further comprising an amount of a suitable pigmented ink; an amount of at least one species of polyurethane material; and an amount of a silane material.

32 Claims, 1 Drawing Sheet

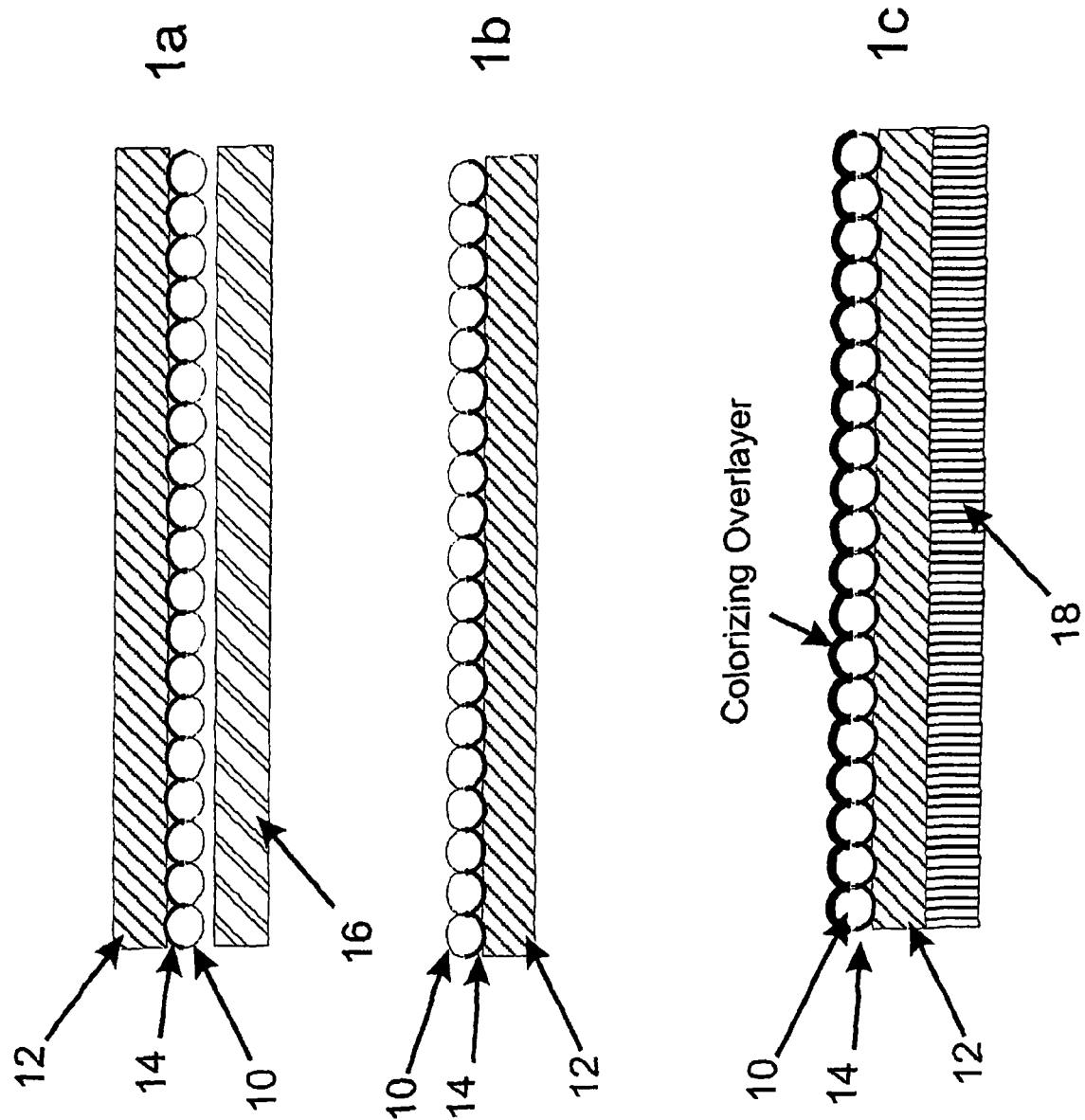

COLORIZED RETROREFLECTIVE MATERIAL AND METHOD

BACKGROUND OF THE INVENTION

I. Field of the Invention

The present invention relates generally to colorized durable, highly retroreflective materials, particularly colorized retroreflective materials for application to garments which retain both color and high retroreflectivity through many laundering cycles.

II. Related Art

Retroreflective materials of various kinds have been in use for many years. Applications have included road paints, road signs and various kinds of personal protective equipment including wearing apparel. In order to improve nighttime visibility and safety of pedestrians, cyclists, roadway workers, joggers and others who might otherwise be difficult to identify, they have been provided with clothing having retroreflective materials attached which are designed to reflect light back in the direction of incidence. In this manner, incident light such as that of automobile headlights is reflected back to the automobile, making the presence of the wearer clearly visible to the driver of the vehicle. The same easy visualization can be obtained using spotlights, searchlights and even flashlights.

Prior retroreflective technology for textiles and garments includes an array of transparent retroreflective elements partially embedded with a reflective undercoating in a binder layer which, in turn, binds the embedded beads to a layer of material which can be fixed to an article of clothing. The retroreflective elements are generally spherical glass microbeads. The technology has been generally based on one of several techniques.

One technique involves heat transfer films in which glass beads are hemispherically vapor-coated with a reflective material (silver, aluminum or a clear mirror coat used on white/clear reflective films). These beads are then deposited on a bead-bonding adhesive such that the reflective-coated side is in contact with the bead-bonding adhesive and the non-coated side is exposed. The bead bond adhesive is then coated with a second adhesive which provides adhesion to a garment. This adhesive is generally a hot-melt adhesive designed for heat lamination to a fabric. Alternatively, the second adhesive may be a pressure-sensitive adhesive. However, pressure-sensitive adhesives generally are not satisfactory for use on fabrics exposed to multiple laundering cycles.

Another approach involves retroreflective fabrics. These fabrics are quite similar in construction to heat transfer films, however, in this case a fabric layer is applied and bonded to the second adhesive directly after coating and before application to a garment. This produces a reflective fabric construction that can be stored and later sewn onto garments.

A third approach is found in reflective transfer paper. In this approach, glass beads are bonded to a transfer paper using a thin coating of polyethylene. A vapor coat of reflective material is then applied to the top of the glass beads. Garment and bead-bonding adhesives (generally heat-transfer adhesives) are then printed over the coated side of the glass beads. This can be done using a screen-printing process, in which a prescribed design is printed in adhesive on the transfer paper. This transfer is then applied to a garment by heat lamination. The polyethylene liner only releases beads that are held by the printed heat transfer adhesives. The transfer paper is then removed leaving reflective glass beads according to the pattern of the printed adhesives.

It is also known to provide retroreflective articles having launderably durable bonded retroreflective elements. Such a material is illustrated and described, for example, in U.S. Pat. No. 5,976,669 in which an array of retroreflective elements are arranged and partially embedded in a binder layer that contains a solid polyurethane blend.

It is also known to provide colorized retroreflective materials by providing a colorized layer on the underside of partially embedded retro reflective elements overlaid by a reflective layer. Examples of this type are found in U.S. Pat. Nos. 5,344,705; 5,503,906 and 5,620,613. The vast majority of reflective material incorporated into personal protective equipment is and has been silver in color, however.

Vinyl-based materials that are not made with glass-bead retroreflective technology have also been used. Materials of this type that are currently being used have generally been found to be somewhat uncomfortable for the wearer and are, accordingly, less desirable for use on clothing.

While progress has been made, demand is increasing for retroreflective garments that not only provide a high level of reflectivity but also which are comfortable for the wearer and aesthetically pleasing. This includes a large demand for reflective material that matches the colors of uniforms, for example. Many companies also have large numbers of employees that work in or near traffic who need retroreflective garments but which would preferably reflect other colors than silver which might clash with corporate logo images or the overall appearance of the uniform.

Present, commercially available colorized retroreflective materials have been found lacking. They do not provide either the level of reflectivity or durability that is necessary for use in uniforms or other garments worn on a daily basis. Such garments are generally subjected to hard use and are laundered a total of 50 or more times before being removed from service. Therefore, there is a need for retroreflective materials incorporated in such garments which enable the items to maintain a high level of reflectivity and appearance throughout the useful life of the garment, which would encompass numerous laundering cycles.

The preferred standard for the level of reflectivity that the reflective material should initially have is a reflectivity of 330 $cd/lux/m^2$. The standard also requires the material to maintain a reflectivity of more than 100 $cd/lux/m^2$ throughout the life of the garment (ANSI/ISEA 107-2004, level 2, reflectivity measured at an observation angle of 12', and an entrance angle of 5°).

SUMMARY OF THE INVENTION

The present invention overcomes many of the limitations of and solves many of the problems associated with prior colorized retroreflective materials. The present invention provides colorizing compositions for retroreflective materials in the form of film or fabrics that enable them to be colorfast and retain both a high level of reflectivity (≥100 $cd/lux/m^2$) and color throughout a large number of laundering cycles.

According to one aspect of the present invention, the colorizing compositions are applied as an overlayer or overprint on a variety of retroreflective materials which include retroreflective elements, which may preferably be glass beads embedded with a reflective coating applied to their undersides in an adhesive binder material. The colorizing composition layer is sufficiently thin and transparent enough to allow a high percentage of incident light to pass through to the reflective surface and reflect back out through the beads, thereby retaining a high degree of reflectivity yet providing sufficient color to be aesthetically pleasing.

Another aspect of the invention involves the colorizing composition formulations themselves. Colorizing compositions have been developed that exhibit good adhesion to the glass bead surfaces, provide wash durability and include a solvent that does not interfere with the bead-binder adhesive bond in the reflective material during or after printing. These compositions maintain their color and adhesion to the reflective materials under standard wash conditions using water as hot as 150° F. (65.6° C.) employing standard detergents.

For use on clothing that undergoes industrial laundering, colorizing formulations have been developed that are chemically resistant to detergents containing high alkalinity and strong bases including sodium hydroxide and potassium hydroxide in water temperatures as high as 170° F. (76.7° C.) and stable under drying temperatures in which the fabric is heated as high as 140° F. (60° C.).

The preferred colorizing overlayer compositions are a blend of a plurality of materials in a substantially aqueous medium. These compositions include, and begin with, a suitable water-based pigment of a desired color. This pigment may or may not come as a prepared ink. Preferably, this is combined with an amount of one or more water-based polyurethane materials in the form of an aqueous dispersion and a minor amount of an additive which provides stability through crosslinking reactions (e.g. siloxane compounds).

The use of a water-based system precludes interference with normal adhesive bonds generally used for the retroreflective elements that would occur using certain solvent based systems. Other solvents can be used so long as they are compatible with the bead binding adhesive such that the bead-bond is not diminished, nor is the adhesion of the film to fabric.

The color can be added using numerous pigments that are compatible with water-based systems and/or polyurethanes. A preferred ink category is aqueous pigmented flexographic ink which is both fade resistant and is as transparent as possible. Prepared inks are used primarily for ease of production; they include the additives necessary for processability. Exemplary inks of the class are available as "Super Fade Resistant" inks from Environmental Inks, Inc. of Morgantown, N.C. These materials may include a UV stabilization agent to aid in color stability, and various additives for pH control, stability, and viscosity control. Inks of this class have been found to provide excellent and stabilized colorization to the retroreflective coatings of the invention.

The ink is combined with one or more additional materials which include water-based polyurethane materials. Preferred classes of these polyurethanes include polyester-based, polyether-based, and polycarbonate-based polyurethanes. An exemplary embodiment uses a mixture or combination of compatible semi-crystalline polyester-based polyurethanes, and amorphous, rubbery, polyether-based polyurethanes. In this regard, the crystalline component generally adds rigidity or permanent stability to the applied colorizing material and the amorphous, rubbery material gives it a clear, flexible plastic quality making it extremely elastic above its glass transition temperature. One highly successful combination combined Dispercoll U54 (Bayer) semi-crystalline polyester-based polyurethane with Witcobond W-170 (Crompton) amorphous polyether-based polyurethane in generally equal proportions as water dispersions. This embodiment provided excellent color stability during washing in hot or warm water using commercially available home detergents. A second embodiment employed a polycarbonate-based polyurethane, Bayhydrol 124 (Bayer), which has improved resistance to hydrolysis. This provides improved performance under high-alkalinity, high temperature (170° F., 76.7° C.) and high pH laundering profiles.

To the above pigmented polyurethane mixture may be added a minor amount of silane material. Silane additives have been found to improve adhesion and cause the polymeric components to crosslink, and so as to further stabilize wash durability of the colorized retroreflective material. Of the silanes suitable for use in water-based systems, epoxide-functional silanes are preferred as they are more compatible with the preferred colorizing compositions. One highly successful silane in the above combinations when added in an amount of 0.1%-15% (wt./wt.) is gamma-glycidoxypropyltrimethoxysilane which may be obtained as Silquest A-187.

Amine-based silanes can also be used in some water-based systems and additives of that nature may be compatible with other suitable ink formulas.

One preferred embodiment utilizes generally equal parts by weight of an aqueous solution of Super Fade Resistant Environmental Ink and a mixed polyurethane dispersion solution containing generally equal parts by weight of aqueous dispersions of W-170 and U-54 polyurethane. These materials may be diluted to 75-80% in water. To this is added a minor amount (about 2%) of silane additive, gamma-glycidoxypropyltrimethoxysilane (Silquest A-187).

It has further been found that controlling the thickness of the colorizing composition overlayer is important to strike a balance between the amount of colorizing and the retention of high retroreflectivity. Although tolerances will vary based on the particular colorizing composition, it has generally been found that a uniform thickness of less than 1 mil yields the highest initial reflectivity of the reflective material. Processes that press the colorizing formula into the voids between the retroreflective elements give the best results. Acceptable results have been obtained using a modified printer which floods the surface of the materials with ink and removes the excess with a rubber squeegee. Similar processes based on flood coating the reflective surface and removing the excess coating, such as using roll-to-roll type machine which can be used to impart a thin pressed coating, can be successfully used.

It has further been found that wash durability increases significantly if the colorizing coating composition undergoes a heating step. This may occur during the application if the material is applied as a heat transfer film which undergoes a heating step during lamination to a garment. If used on a laminated fabric, the fabric may be subjected to a heat treatment step after application of the colorizing overlayer. This, for example, using the above preferred formulation, when heated at 40 psig to 350° F. (176.7° C.) for a period of 20 seconds, yields a coating with improved durability during laundering. A thin pressed layer of the colorizing formula yielded an initial reflectivity above 330 cd/lux/m$^2$. Cloth using that coating was found to be soft and pliable to the touch and very durable through 60 wash cycles.

It has further been found that wash durability is increased by segmenting the reflective material into a non-solid pattern as is described in U.S. Pat. No. 6,859,941. This further alleviates a problem found with continuous colorized reflective material where, in the case of large solid patterns, the pattern tends to wash out first, leaving a non-uniformly colored reflective patch. Cutting the patch into divided patterns enables it to remain esthetically intact.

BRIEF DESCRIPTION OF THE DRAWINGS

In the drawings wherein like numerals designate like parts throughout the same:

FIGS. 1a-1c depict the colorizing of a retroreflective film or fabric in accordance with the invention.

DETAILED DESCRIPTION

The following detailed description presents certain embodiments to illustrate the inventive concepts, but which are meant by way of example only and are not intended to limit the scope of the invention in any manner. In accordance with the invention, it has been learned that reflective films or fabrics can be effectively and permanently colorized by the application of a thin translucent colorized coating to the exposed reflective elements. It has further been found that coating compositions with suitable durability for colorizing reflective materials include a combination of components including an amount of a generally transparent pigmented ink, an amount of one or more species of polyurethane materials and a minor amount of a compatible silane material.

It has further been found that the colorizing coating composition requires the use of materials including any solvents which are relatively inert relative to and which do not disturb the reflective element/binder bond of the reflective film or fabric to which the colorized composition is applied. Because the great majority of these fabrics use adhesives which are not affected by water-based systems, these are preferred. However, it will be understood by those skilled in the art that compatibility between the colorizing composition solvent and the reflective element adhesive is the important consideration. The colorizing composition must be such that the integrity of the reflective element layer is not disturbed by the addition of the colorizing overlayer. Thus, a compatible solvent is one that does not affect adhesion of the binder layer. For example, several polyurethane dispersions contain acetone or n-methylpyrrilidone in minor amounts, which do not disturb the integrity of the reflective element layer or the bond between the bead-bond adhesive and the reflective beads.

A further aspect of the invention is that the colorizing compositions are designed to be applied to a variety of types of reflective films or fabrics that have a layer of generally closely packed, very small, exposed micro reflective elements partially imbedded in an adhesive layer with or without additional laminate layers. Particular applications include reflective transfer materials such as iron-on patches or cloth-backed materials to be sewn on a garment. These reflective materials are well known and typically manufactured by one of the techniques mentioned above.

As indicated, a primary result of using the colorizing coating compositions of the invention is the addition and retention of sufficient color to make the resulting retroreflective material esthetically pleasant without any significant reduction in reflectivity. In addition, the colorizing coating compositions of the invention enable these characteristics to endure over the normal laundering life of garments to which they are applied. Additionally, the colorized coating compositions of the present invention are compatible with conventional retroreflective materials and retain sufficient open time to enable conventional saturation/pressing over-printing processes using a squeegee or other devise to remove excess colorizing composition.

This has all been accomplished by the application of a class of colorizing overlayer materials which, according to the present invention, provide the necessary combination of characteristics long sought in colorized retroreflective articles of clothing. The preferred colorizing overlayer includes generally the following components:

1. An amount of a pigmented ink of a desired hue selected from a class of aqueous, pigmented flexographic inks which are colorfast (fade resistant) and as transparent as possible and susceptible to some dilution;
2. An amount of at least one species of polyurethane material of a class including water-based polyurethane emulsions which add improved adhesion and/or elasticity to the composition and which are compatible with the pigmented ink; and
3. A minor amount of a silane additive to further improve composition retention in the material.

FIGS. 1a-1c depict the colorizing of a retroreflective film or fabric in accordance with the invention. The material includes an array of glass bead reflective elements 10 partially embedded in an adhesive binder layer 12 and vapor-deposited or chemically coated with a reflective material at 14. A removable liner or release layer is shown at 16. In FIG. 1b, the release layer has been removed and the top of the embedded microbeads 10 is exposed for coating. In FIG. 1a, the colorizing overlayer has been applied to the exposed area of the microbeads and an optional additional laminated layer of cloth material is shown at 18.

EXAMPLES

The invention will be further described by the following examples which are intended to illustrate the invention and not to limit the scope of the concepts in any manner.

Unless otherwise indicated, the following test methods were used.

Retroreflectivity:

Retroreflective brightness was measured using a retroreflectometer at observation angles of about 0.2° and entrance angles of about −4.0°.

Color:

The daytime color of the colorized reflective materials were measured using a calorimetric spectrophotometer with 45°/0° optics, a density status setting of T, a standard illuminant D65 light source setting, and a standard observer setting of 2°.

Example 1

Three colorizing compositions containing a water-based pigmented ink, an aqueous polyurethane dispersion, a silane, and water were used to colorize 3M Scotchlite® 8711 retroreflective heat transfer film. A 13.94 g aliquot of aqueous polyurethane dispersion was diluted with 8.69 g of water and mixed in a glass vial. A 1:1-wt mixture of two different polyurethane dispersion mixtures was used; a semi-crystalline polyester-based polyurethane (Bayer Dispercoll U-54) and a rubbery, amorphous, polyether-based, polyurethane (Witcobond W-170). A water-based brown-pigmented ink was produced by adding equal amounts of water (23.50 g) and commercially-available water-based ink (23.35 g, Environmental Inks and Coatings, Film III, Super Fade Resistant, Brown). Under vigorous stirring with a Teflon-coated magnetic stirbar, 6.71 g of diluted water-based brown pigmented ink was added slowly to the polyurethane dispersion mixture until homogenous. At this time, 0.5 grams of gamma-glycidoxypropyltri-methoxysilane (Silquest A-187) was added while stirring until homogeneous.

In a similar manner, a gold-pigmented colorizing composition was mixed using 5.57 g of polyurethane dispersion, 8.35 g of water, 6.10 g of diluted water-based gold-pigmented ink (from a master batch which was diluted with water, 10.33 grams of gold ink, and 10.40 grams of water), and 0.41 g of gamma-glycidoxypropyltri-methoxysilane.

Each of colorizing compositions were spread onto the glass-bead surface of retroreflective heat transfer films (3M Scotchlite® 8711) using a rubber-squeegee to spread the colorizing composition uniformly across the retroreflective material. In a similar manner, each of the colorizing compositions were applied to two other retroreflective heat transfer films (3M Scotchlite® 8725, and 9720). The colorized films were then dried at room temperature overnight and subsequently laminated onto a polyester-fabric shirt at 350° F., 40 psig, for a dwell time of 20 seconds. After cooling, retroreflectivity measurements were taken. The garment was washed a total of 80 cycles in warm water (105-115° F.), drying every $5^{th}$ cycle and taking retroreflectivity data. The results of the reflectivity (Ra) and the color (L*a*b*) measurements are in the following table.

| Sample | Color | Material | Initial $R_a$ cd/lux/m² | $R_a$ after 80 wash cycles cd/lux/m² | Initial Color | | | Color after 80 Wash Cycles | | | |
|---|---|---|---|---|---|---|---|---|---|---|---|
| | | | | | L* | a* | b* | L | a* | b* | ΔE |
| A | Brown | 8711 | 446 | 213 | 33.18 | 0.88 | 1.46 | 35.05 | −0.11 | 3.44 | 2.90 |
| B | Brown | 8725 | 535 | 310 | 34.24 | 0.80 | 1.58 | 35.82 | −0.22 | 3.78 | 2.89 |
| C | Brown | 9720 | 604 | 401 | 40.61 | 1.33 | 3.77 | 41.35 | 1.23 | 5.30 | 1.70 |
| D | Gold | 8711 | 587 | 298 | 49.04 | 2.96 | 16.22 | 45.18 | 3.37 | 15.71 | 3.92 |
| E | Gold | 8725 | 616 | 368 | 48.04 | 2.37 | 14.16 | 45.66 | 2.00 | 14.27 | 2.41 |
| F | Gold | 9720 | 574 | 387 | 58.71 | 6.80 | 23.06 | 55.36 | 5.64 | 20.60 | 4.32 |

Example 2

In a similar manner to Example 1, a series of 9 different polyurethane dispersions were used to make colorizing compositions. Each polyurethane dispersion was diluted with water to 32%-wt solids content, based on their respective concentrations as received (see Table below).

| | Polyurethane Dispersion | | Polyurethane Class | %-wt Solids |
|---|---|---|---|---|
| A | Dispercoll | U53 | Polyester | 40 |
| B | Dispercoll | U54 | Polyester | 50 |
| C | Bayhydrol | 124 | Polycarbonate | 35 |
| D | Impranil | DLU | Polycarbonate | 60 |
| E | Witcobond | W-170 | Polyether | 35 |
| F | Witcobond | W-240 | Polyester | 30 |
| G | Witcobond | W-244 | Polyester | 40 |
| H | Witcobond | W-281F | Polyester | 40 |
| I | Witcobond | W-320 | Polyether | 40 |

150 grams of a blue-pigmented ink (Environmental Inks and Coatings, Film III, Super Fade Resistant, Process Blue) was diluted to 75%-wt by adding 50 grams of water and stirring until homogeneous. 20 gram aliquots of colorized compositions were made by adding 10 gram aliquots of diluted blue-pigmented ink to 10 gram aliquots of each polyurethane dispersion. The colorized compositions were then applied to reflective film (3M Scotchlite® 8725) employing the process described in Example 1.

For comparison, 12.0 grams of a 1:1 ratio mixture of U54 and W170 was diluted with 3.0 grams of water. Red pigmented ink (Environmental Inks and Coatings, Film III, Super Fade Resistant, Red) was diluted to 75%-wt by adding 5.0 grams of water to 15.0 grams of red pigmented ink. A 15.0 gram aliquot of the diluted red-pigmented ink was added to the polyurethane mixture and the solution was stirred. A 0.6 gram amount of gamma-glycidoxypropyltri-methoxysilane (Silquest A-187) was then added and the composition was stirred until homogeneous. This red-pigmented color composition was then applied to two different retroreflective heat transfer films (3M Scotchlite® 8725, and Unitica MR-3501) according the process described in Example 1.

These colorized retroreflective films were laminated to a polyester fabric using the method described in Example 1.

The fabric was laundered a total of 25 cycles in hot water (145-155° F.), drying every 5 cycles and taking retroreflectivity data and color data.

| Sample | | | Initial $R_a$ | $R_a$ after 25 wash cycles | Initial Color | | | Color after 25 Wash Cycles | | | |
|---|---|---|---|---|---|---|---|---|---|---|---|
| | Color | Material | cd/lux/m² | cd/lux/m² | L | a | b | L | a | b | ΔE |
| A | Blue | 8725 | 465 | 402 | 38.63 | −9.17 | −23.00 | 37.86 | −11.22 | −9.08 | 14.09 |
| B | Blue | 8725 | 440 | 345 | 35.49 | −6.08 | −27.40 | 36.83 | −9.83 | −11.06 | 16.82 |
| C | Blue | 8725 | 417 | 417 | 41.91 | −11.00 | −18.37 | 39.91 | −10.53 | −10.11 | 8.50 |
| D | Blue | 8725 | 114 | 424 | 41.54 | −11.88 | −21.62 | 38.58 | −10.58 | −7.84 | 14.15 |
| E | Blue | 8725 | 234 | 299 | 36.71 | −12.35 | −24.67 | 38.39 | −10.62 | −9.34 | 15.52 |
| F | Blue | 8725 | 437 | 425 | 42.68 | −10.24 | −19.96 | 40.02 | −8.81 | −11.83 | 8.67 |
| G | Blue | 8725 | 459 | 407 | 38.93 | −10.07 | −23.74 | 38.89 | −9.10 | −14.78 | 9.01 |
| H | Blue | 8725 | 354 | 431 | 43.16 | −11.60 | −18.22 | 39.13 | −10.29 | −9.08 | 10.08 |
| I | Blue | 8725 | 43 | 424 | 42.10 | −11.15 | −21.70 | 39.11 | −9.31 | −8.75 | 13.42 |
| J | Red | 8725 | 520 | 304 | 36.76 | 27.95 | 11.46 | 36.45 | 22.29 | 7.77 | 6.77 |
| K | Red | MR-3501 | 267 | 390 | 34.08 | 35.13 | 17.78 | 37.69 | 30.50 | 11.18 | 8.84 |

Example 3

A set of 3 colorizing compounds were prepared using the procedure outlined in Example 1. Polyurethane dispersions were added to water to make solutions that were approximately 32%-wt solids.

| Polyurethane | | Amount of Polyurethane g | Amount of Water g |
|---|---|---|---|
| A | Dispercoll U54 + Witcobond W170 | 200 | 300 |
| B | Bayhydrol 124 | 458 | 42 |
| C | Witcobond W-244 | 401 | 100 |

A 75%-wt solution of blue-pigmented ink (Environmental Inks and Coatings, Film III, Super Fade Resistant, Process Blue) was added to each dispersion in a 1:1 ratio using the process described in the previous examples. A total of 9 different silane compounds were used as additives to each of these three polyurethanes using the method described above to make a total of 27 different colorizing compositions. These silanes are described in the table below. The 27 combinations are named by letter of polyurethane followed by number of silane.

| | Silane | | Chemical name | Functionality |
|---|---|---|---|---|
| 1 | Silquest | A-171 | vinyltrimethoxysilane | vinyl- |
| 2 | Silquest | A-163 | methyltri methoxysilane | methyl- |
| 3 | Silquest | A-1637 | 4-amino-3,3-dimethylbutltrimethoxysilane | amino- |
| 4 | Silquest | A-Link 25 | Gamma-isocyanatopropyltriethoxysilane | isocyanato- |
| 5 | Silquest | A-1524 | Gamma-uriedopropylmethoxysilane | ureido- |
| 6 | Silquest | A-186 | Beta-(3,4 epoxycyclohexyl)ethyltrimethoxysilane | epoxy- |
| 7 | Silquest | A-189 | Gamma-mercaptopropyltrimethoxysilane | mercapto- |
| 8 | Silquest | A-174NT | Gamma-methacryloxypropyltrimethoxysilane | methacryloxy- |
| 9 | Silquest | A-187 | Gamma-glycidoxypropyltrimethoxysilane | glycidoxy- |

Each of the 27 compositions were applied to 3M Scotchlite® 9720 Industrial Washable reflective film employing the method described in Example 1. The colorized reflective films were then applied to a polyester fabric. The fabric was industrially laundered at water temperatures up to 175° F., using industrial detergents for 5 cycles, and dried. Color and reflectivity data were then obtained.

| Sample Color | Material | Initial $R_a$ cd/lux/m² | $R_a$ after 5 wash cycles cd/lux/m² | Initial Color | | | Color after 5 Wash Cycles | | | ΔE |
|---|---|---|---|---|---|---|---|---|---|---|
| | | | | L | a | b | L | a | b | |
| A-1 Blue | 9720 | 510.0 | 446.0 | 36.90 | −7.88 | −28.77 | 58.88 | −6.93 | 5.61 | 40.82 |
| A-2 Blue | 9720 | 404.0 | 468.0 | 37.84 | −8.64 | −27.53 | 57.00 | −7.51 | 4.25 | 37.13 |
| A-3 Blue | 9720 | 375.0 | 414.0 | 37.26 | −8.63 | −29.83 | 56.61 | −9.00 | 2.76 | 37.90 |
| A-4 Blue | 9720 | 346.5 | 372.0 | 37.42 | −8.37 | −27.87 | 57.51 | −7.36 | 3.91 | 37.61 |
| A-5 Blue | 9720 | 452.5 | 475.5 | 38.74 | −9.00 | −25.73 | 57.69 | −5.78 | 5.40 | 36.58 |
| A-6 Blue | 9720 | 497.0 | 471.5 | 40.35 | −9.43 | −24.00 | 56.95 | −7.35 | 3.78 | 32.43 |
| A-7 Blue | 9720 | 554.5 | 460.5 | 36.37 | −7.55 | −29.85 | 57.37 | −6.70 | 4.37 | 40.16 |
| A-8 Blue | 9720 | 621.5 | 435.0 | 34.63 | −5.18 | −31.47 | 57.27 | −7.87 | 3.26 | 41.55 |
| A-9 Blue | 9720 | 542.5 | 478.0 | 36.05 | −7.36 | −30.11 | 57.72 | −6.63 | 3.68 | 40.14 |
| B-1 Blue | 9720 | 522.5 | 423.0 | 39.62 | −8.90 | −26.28 | 47.77 | −12.96 | −13.32 | 15.84 |
| B-2 Blue | 9720 | 417.5 | 440.0 | 39.46 | −9.15 | −25.27 | 48.42 | −12.19 | −10.55 | 17.50 |
| B-3 Blue | 9720 | 493.0 | 456.5 | 36.82 | −5.99 | −30.95 | 46.67 | −10.19 | −15.09 | 19.14 |
| B-4 Blue | 9720 | 440.0 | 338.5 | 38.48 | −7.89 | −28.75 | 45.51 | −11.77 | −16.05 | 15.03 |
| B-5 Blue | 9720 | 472.0 | 446.0 | 41.31 | −9.49 | −23.57 | 49.77 | −11.87 | −9.83 | 16.30 |
| B-6 Blue | 9720 | 500.0 | 460.0 | 40.09 | −8.82 | −25.95 | 49.05 | −10.85 | −10.94 | 17.60 |
| B-7 Blue | 9720 | 598.5 | 430.0 | 39.15 | −8.29 | −26.97 | 52.67 | −10.07 | −6.62 | 24.50 |
| B-8 Blue | 9720 | 585.0 | 441.5 | 36.85 | −6.77 | −29.40 | 49.51 | −11.01 | −10.21 | 23.38 |
| B-9 Blue | 9720 | 526.0 | 446.0 | 38.50 | −7.97 | −27.68 | 44.79 | −11.07 | −17.39 | 12.46 |
| C-1 Blue | 9720 | 625.5 | 421.0 | 37.13 | −8.64 | −30.38 | 50.24 | −10.17 | −8.14 | 25.86 |
| C-2 Blue | 9720 | 494.0 | 442.0 | 38.46 | −9.36 | −28.02 | 48.41 | −10.02 | −10.79 | 19.90 |
| C-3 Blue | 9720 | 471.5 | 474.0 | 37.85 | −10.83 | −28.49 | 47.27 | −11.38 | −17.83 | 14.24 |
| C-4 Blue | 9720 | 560.5 | 453.5 | 37.50 | −7.55 | −30.73 | 46.74 | −9.24 | −13.56 | 19.57 |
| C-5 Blue | 9720 | 599.0 | 474.0 | 38.95 | −9.42 | −29.24 | 49.92 | −10.14 | −9.33 | 22.74 |
| C-6 Blue | 9720 | 577.5 | 427.5 | 38.36 | −8.95 | −28.19 | 46.05 | −9.38 | −16.04 | 14.39 |
| C-7 Blue | 9720 | 539.5 | 421.5 | 38.72 | −8.18 | −27.26 | 50.37 | −9.75 | −8.96 | 21.74 |
| C-8 Blue | 9720 | 511.0 | 441.0 | 38.78 | −9.40 | −27.32 | 49.11 | −10.38 | −11.75 | 18.71 |
| C-9 Blue | 9720 | 516.5 | 470.0 | 40.53 | −9.93 | −24.69 | 46.07 | −10.47 | −16.71 | 9.73 |

What is claimed is:

1. A launderable, colorized retroreflective material comprising:
   (a) a launderable retroreflective material suitable for colorizing, the retroreflective material including transparent reflective elements, having an outer retroreflective surface;
   (b) a launderable, substantially transparent, light transmitting, water-based colorizing coating layer located on the outer retroreflective surface of the retroreflective material and through which light is reflected, the coating layer formed from a composition comprising:
      1) an amount of a suitable pigment;
      2) an amount of at least one species of polyurethane material; and
      3) an amount of a silane material, wherein the silane material is suitable for water-based systems; and
   (c) the coating layer having a thickness to provide a post laundering reflectivity in excess of 100 cd/lux/m$^2$.

2. The material of claim 1 wherein the composition is forcibly embedded into said retroreflective material.

3. The material of claim 1 wherein said polyurethane materials of the composition are water-based materials selected from the group consisting of water-based polyester-based, polyether-based and polycarbonate-based polyurethanes.

4. The material composition as in claim 1 wherein said silane is present in an amount of 0.01-15% weight/weight.

5. The material of claim 1 wherein said polyurethane material of the composition is a plurality said water-based materials selected from the group consisting of water-based polyester-based, polyether-based and polycarbonate-based polyurethanes.

6. The material of claim 1 wherein said silane is a glycidoxy-functional silane.

7. The material of claim 1, wherein the pigment of the composition is a pigmented ink.

8. The material of claim 1, wherein the coating layer having a thickness to provide a post laundering reflectivity in excess of 200 cd/lux/m$^2$.

9. The material of claim 1, wherein the reflective material is cut into logos, shapes, or other graphic images.

10. The material of claim 1, wherein the reflective material comprises a heat transfer adhesive film.

11. The material of claim 1, wherein the reflective material comprises a pressure-sensitive adhesive.

12. The material of claim 1, wherein the reflective material comprises a fabric.

13. The material of claim 1, wherein the reflective material comprises a thermoplastic film.

14. The material of claim 1, wherein the reflective material comprises a synthetic or natural leather.

15. The material of claim 1, wherein the reflective material comprises an elastic film.

16. The material of claim 1 wherein said silane of the composition is selected from the group consisting of epoxide-functional, amine-functional, and glycidoxy-functional silanes.

17. The material as in claim 16 wherein said silane is present in an amount of 0.01-15% weight/weight.

18. The material of claim 3 wherein said polyurethane materials of the composition comprise at least one crystalline polyester-based polyurethane material and at least one amorphous polyester based polyether-based polyurethane material.

19. The material of claim 18 wherein said crystalline polyester-based polyurethane material and amorphous polyester based polyether-based polyurethane material are provided in generally equal amounts.

20. A heat treated, launderable, colorized retroreflective article comprising:
   (a) a launderable retroreflective material suitable for colorizing, the retroreflective material including transparent reflective elements, having an outer retroreflective surface;
   (b) a launderable, substantially transparent, light transmitting, water-based colorizing coating layer located on the outer retroreflective surface of the retroreflective material and through which light is reflected, the coating layer formed from a composition consisting essentially of:
      1) an amount of a suitable pigment;
      2) an amount of at least one species of polyurethane material; and
      3) an amount of a silane material, wherein the silane material consists of one of epoxide-functional, amine-functional, and glycidoxy-functional silane; and
   wherein the coating layer has a thickness sufficient to provide a post laundering reflectivity in excess of 100 cd/lux/m$^2$.

21. The material of claim 20 wherein the retroreflective material is segmented into a non-continuous pattern after the application of the colorizing overlayer.

22. The material of claim 20 further being laminated to a fabric to the non-reflective surface.

23. The material of claim 20, wherein the retroreflective material has an outer retroreflective surface of micro-reflective elements suitable for colorizing and the substantially transparent, light transmitting colorizing coating layer is a substantially transparent colorizing overlayer and the pigment comprises a pigmented ink of selected hue.

24. A launderable, colorized retroreflective material comprising:
   (a) a launderable retroreflective material suitable for colorizing, the retroreflective material including transparent reflective elements, having an outer retroreflective surface;
   (b) a launderable, heat transferable substantially transparent, light transmitting, water-based colorizing film layer located on the outer retroreflective surface and through which light is reflected, the film layer a composition comprising:
      1) an amount of a suitable pigment;
      2) an amount of at least one species of polyurethane material; and
      3) an amount of a silane material, wherein the silane material consists of one of epoxide-functional, amine-functional, and glycidoxy-functional silanes; and
   wherein the film layer has a sufficient thickness to provide a post laundering reflectivity in excess of 100 cd/lux/m$^2$.

25. The material of claim 24, further including a garment or fabric.

26. The material of claim 24 further having an inner surface and backing later formed thereon.

27. The material of claim 26, wherein the coating layer having a thickness to provide a post laundering reflectivity in excess of 200 cd/lux/m$^2$.

28. A heat treatable garment, comprising:
  (a) a launderable garment having an exterior surface;
  (b) a retroreflective material suitable for colorizing, the retroreflective material including transparent reflective elements, having an inner surface and an outer retroreflective surface, the inner surface retained to said exterior surface;
  (c) a launderable, substantially transparent, light transmitting, water-based colorizing coating layer located on the outer retroreflective surface, and through which light is reflected the coating layer formed from a composition comprising:
    1) an amount of a suitable pigment;
    2) an amount of at least one species of polyurethane material; and
    3) an amount of a silane material, wherein the silane material consists of one of epoxide-functional, amine-functional, and glycidoxy-functional silanes; and
  wherein the coating layer has a thickness sufficient to provide a post laundering reflectivity in excess of 100 cd/lux/m$^2$.

29. The material of claim 28, wherein the coating layer having a thickness to provide a post laundering reflectivity in excess of 200 cd/lux/m$^2$.

30. A heat treatable fabric, comprising:
  (a) a launderable fabric having an exterior surface;
  (b) a retroreflective material suitable for colorizing, the retroreflective material including transparent reflective elements, having an inner surface and an outer retroreflective surface, the inner surface retained to said exterior surface;
  (c) a launderable, substantially transparent, light transmitting, water-based colorizing coating layer located on the outer retroreflective surface, the coating layer formed from a composition consisting essential of:
    1) an amount of a suitable pigment;
    2) an amount of at least one species of polyurethane material; and
    3) an amount of a silane material, wherein the silane consists of one of epoxide-functional, amine-functional, and glycidoxy-functional silanes; and
  wherein the coating layer has a thickness sufficient to provide a post laundering reflectivity in excess of 100 cd/lux/m$^2$.

31. The material of claim 30, wherein the coating layer having a thickness to provide a post laundering reflectivity in excess of 200 cd/lux/m$^2$.

32. A launderable, colorized retroreflective material comprising:
  (a) a launderable retroreflective material suitable for colorizing, the retroreflective material including transparent reflective elements, having an outer retroreflective surface;
  (b) a launderable, substantially transparent, light transmitting, water-based colorizing coating layer located on the outer retroreflective surface of the retroreflective material and through which light is reflected, the coating layer formed from a composition consisting essentially of:
    1) an amount of a suitable pigment;
    2) an amount of at least one species of polyurethane material; and
    3) an amount of a silane material, wherein the silane material is suitable for water-based systems; and
  (c) the coating layer having a thickness to provide a post laundering reflectivity in excess of 100 cd/lux/m$^2$.

* * * * *